(12) United States Patent
Faidi et al.

(10) Patent No.: US 7,748,259 B2
(45) Date of Patent: Jul. 6, 2010

(54) SYSTEMS AND METHODS FOR SOLID OXIDE FUEL CELL SURFACE ANALYSIS

(75) Inventors: Waseem Ibrahim Faidi, Schenectady, NY (US); Andrzej May, Schenectady, NY (US); Thomas James Batzinger, Burnt Hills, NY (US); Harry Israel Ringermacher, Delanson, NY (US); Andrew Philip Shapiro, Schenectady, NY (US); Stephane Renou, Clifton Park, NY (US); Daguang Zheng, Torrance, CA (US); Haiyan Sun, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 861 days.

(21) Appl. No.: 11/640,064

(22) Filed: Dec. 15, 2006

(65) Prior Publication Data

US 2008/0145727 A1 Jun. 19, 2008

(51) Int. Cl.
*G01N 21/00* (2006.01)
*H01N 8/10* (2006.01)

(52) U.S. Cl. .......................................... 73/104; 429/30
(58) Field of Classification Search ................. 429/30; 29/623.1; 73/104, 865.8
See application file for complete search history.

(56) References Cited

U.S. PATENT DOCUMENTS 4,982,600 A * 1/1991 Kiso et al. .................... 73/104

* cited by examiner

*Primary Examiner*—Patrick Ryan
*Assistant Examiner*—Thomas H. Parsons
(74) *Attorney, Agent, or Firm*—Francis T. Coppa

(57) ABSTRACT

Systems and methods for solid oxide fuel cell (SOFC) surface analysis. Exemplary embodiments include systems and methods for solid oxide fuel cell (SOFC) surface analysis, including a SOFC having a ceramic surface, a scanner adjacent the ceramic surface for collecting data related to the ceramic surface, a structure for retaining the SOFC with respect to the scanner, a device for collecting a processing the ceramic surface data and a process residing on the device, the process for analyzing and presenting the ceramic surface data.

20 Claims, 16 Drawing Sheets

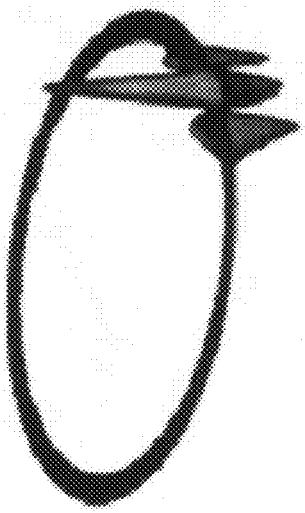
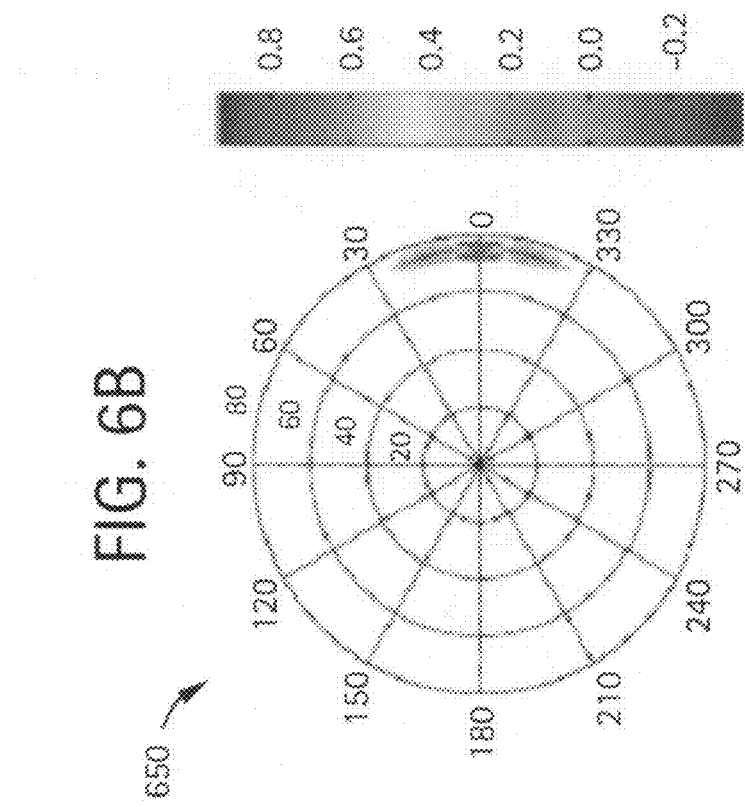
FIG. 6B
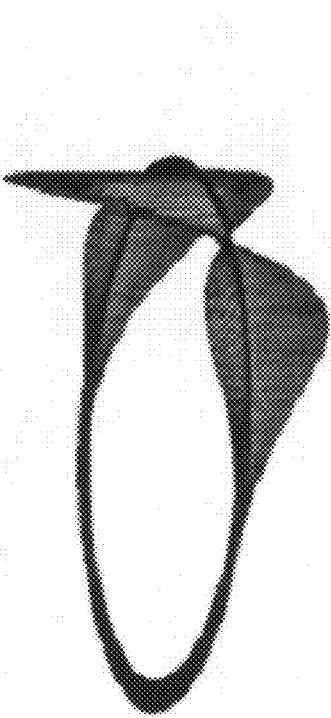
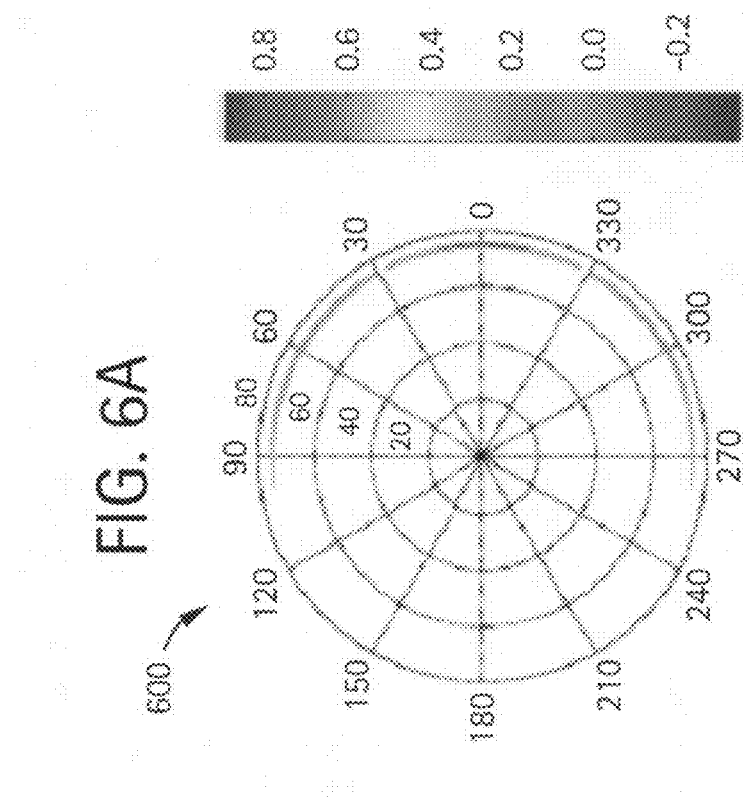
FIG. 6A

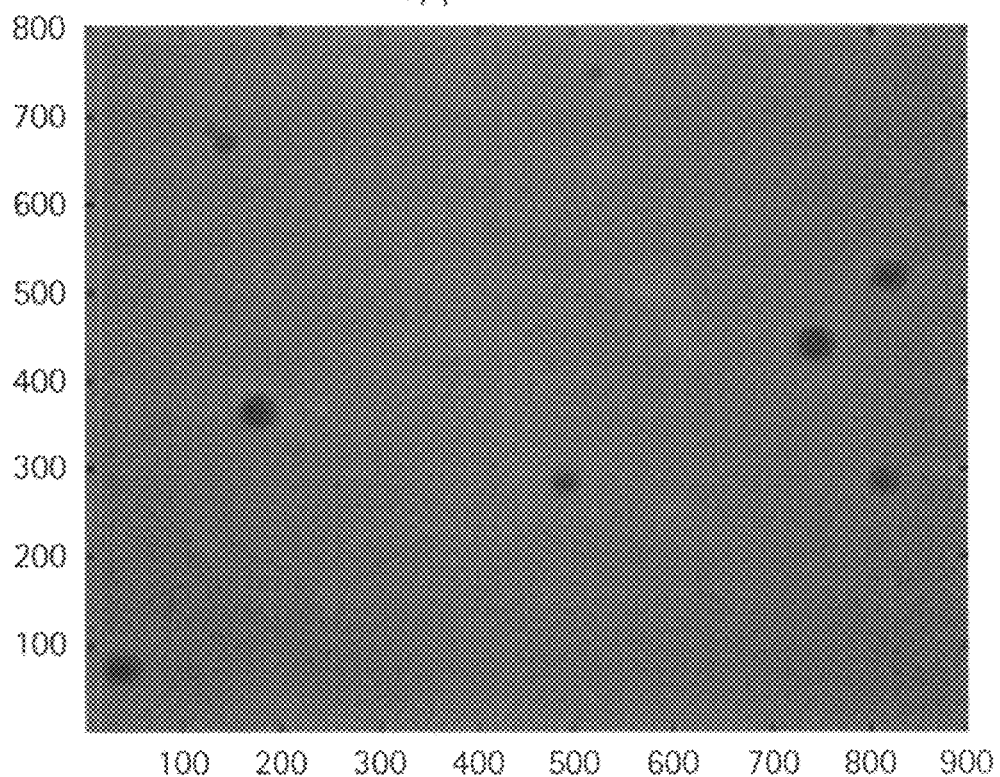

at the surface $x = 0$ at the surface $x = L$ at the surface $x = L$ maximum slope $t\alpha/L^2 = 0.0167$ ½ maximum slope $t\alpha/L^2 = 0.0725$ and $0.495$

SYSTEMS AND METHODS FOR SOLID OXIDE FUEL CELL SURFACE ANALYSIS

BACKGROUND

The present disclosure generally relates to solid oxide fuel cells (SOFC) and more particularly to system and method for SOFC surface analysis.

SOFC using ceramic membranes are used as energy conversion devices. In general, the cell is multi-layer structure fabricated by sintering or deposition method. The surface of the cell is interface for current collection, also for sealing. The flatness and smoothness of SOFC are critical parameters for the contact and seal. Cell flatness problems are related to how to improve fuel cell performance and consistency. Current methods attempt to address cell flatness issues, typically by evaluating density and quality of ceramic coating, but do not address leakage problems of the ceramic surface. Instead, current methods provide a measurement of permeability due to the combined effects of cracks, voids, and porosity. Other methods have been used to inspect the surface quality of ceramic coating, while still other methods are used to measure the gross permeability of the coating. However, none of the methods provides details about the factors affecting the permeability and simultaneously give a quantitative permeability measurement of selected regions in the coating. In addition, the ceramic coatings in SOFC (and in other applications, such as protective and thermal barrier coatings in turbines, combustors and airfoils) are currently inspected with gas leak tests, which provide a gross estimate of the coating permeability without distinguishing between the various causes of the leakage, such as, micro-crack, mud cracks, seal defects, voids, and porosity.

As such, there is a persistent need for systems and methods for SOFC surface analysis.

SUMMARY

Disclosed herein is a solid oxide fuel cell (SOFC) surface analysis system, including a SOFC having a ceramic surface, a scanner adjacent the ceramic surface for collecting data related to the ceramic surface, a structure for retaining the SOFC with respect to the scanner, a device for collecting and processing the ceramic surface data and a process residing on the device, the process for analyzing and presenting the ceramic surface data.

Additional embodiments include a solid oxide fuel cell (SOFC) surface analysis method, including identifying a surface of a SOFC for analysis, generating a measurement wave on the surface, receiving data from the reflected wave from the surface, processing the data to determine surface irregularities and defects and generating a graphical presentation of the surface irregularities and defects.

Further disclosed herein is a system for determining irregularities and defects on a ceramic surface of a SOFC, the system including the ability to retain the SOFC, generate a measurement wave for shining on the SOFC, generate an emitted wave from the SOFC, collect emission data from the SOFC ceramic surface and process the emission data for a determination of the surface irregularities and defects of the ceramic surface.

BRIEF DESCRIPTION OF THE DRAWINGS

The disclosure and embodiments thereof will become apparent from the following description and the appended drawings, in which the like elements are numbered alike:

FIGS. 6a and 6b illustrate projections of the original surface by two different wavelets in accordance with exemplary embodiments;

FIG. 7 illustrates an original x-ray photo of a section of a SOFC cell in accordance with exemplary embodiments;

DETAILED DESCRIPTION

Exemplary systems and methods described herein provide surface analysis of SOFC defects, bumps etc. In a first exemplary embodiment, a system and method for multi-resolution thin film surface analysis implementing wavelet transformation is provided. In a second exemplary embodiment, a system and method for inspection and permeability measurement using dye penetrants is provided.

Multi-Resolution Thin Film Surface Analysis

Figure 1:
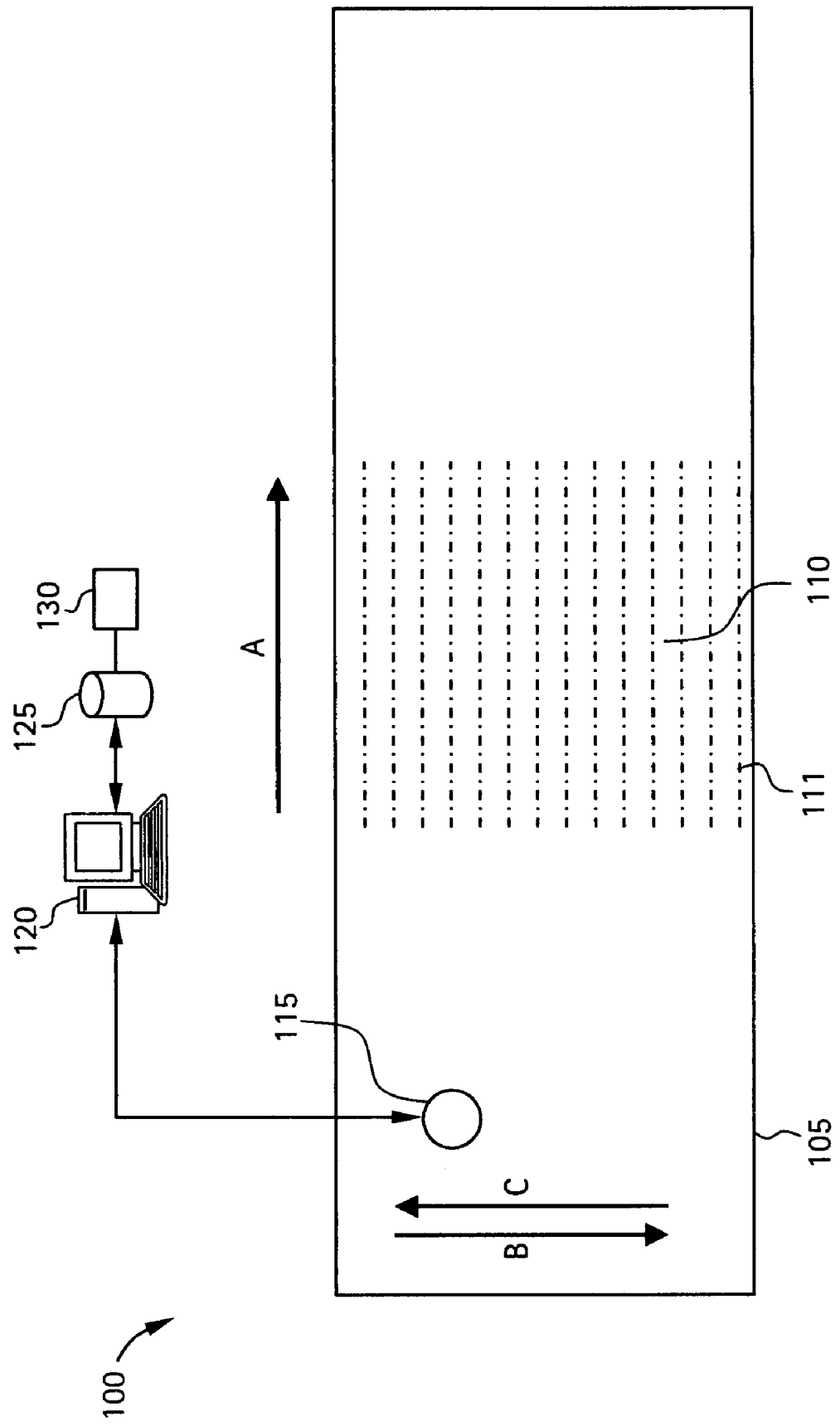
FIG. 1 illustrates an exemplary embodiment of a surface analysis apparatus.
Figure 2:
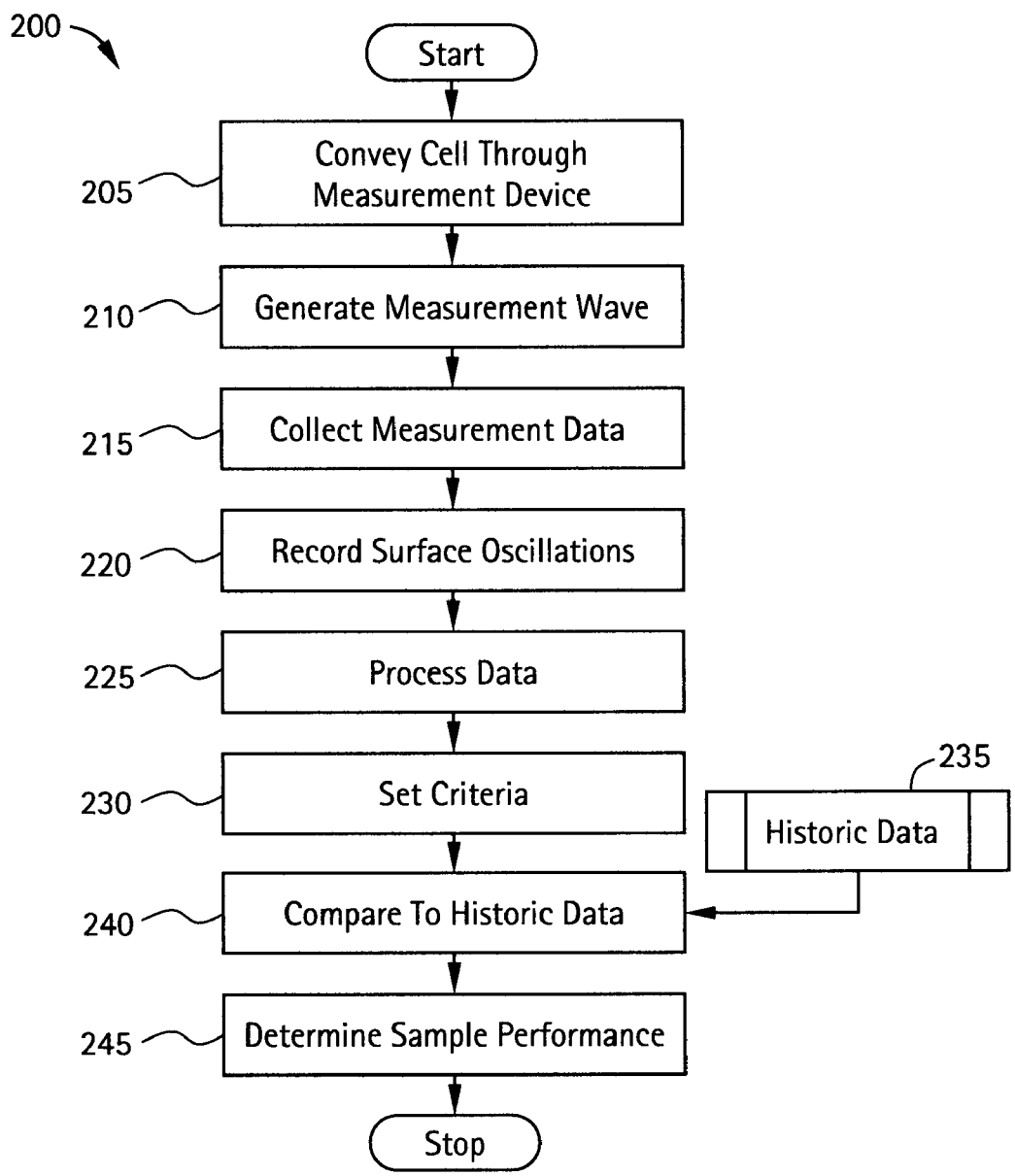
FIG. 2 illustrates a flow chart of an exemplary surface analysis method.

Exemplary embodiments include systems and methods for the surface analysis of solid-oxide ceramic cells to characterize the surface flatness and smoothness, which provides input for QC and manufacturing. Surface data collection systems and methods acquire cell surface data automatically in a continuous mode, machine intelligence (wavelet transforms) software analyzes the data and software provides warnings for quality control. In other exemplary embodiments, infrared scan/photo, MRI, etc can be implemented. In addition, different data analysis algorithms, such as Fourier transforms and windowed Fourier transforms can be implemented. As such, methods for continuous 3-D measurements of ceramic surface, basis function, mesh generation, and parameters used in the wavelet transforms can be implemented to analyze SOFC ceramic surfaces FIG. 1 illustrates an exemplary embodiment of a surface analysis apparatus 100. Apparatus 100 includes conveyor belt 105 onto which sample 110 is placed for measurements. Individual dot points 111 are representative of measurements of irregularities of sample 110. Measurement device (generally having both a measurement wave generator and a scanner for receiving back-scattered waves) 115 is disposed at a location above conveyor belt 105 and sample 110. A measurement area is associated with a scanning area of measurement device 115, through which sample 110 is measured. In general, conveyor belt can be displaced in a direction as indicated by arrow A. Measurement device 115 can be moved along a direction as indicated by arrows B, C. In general, direction of movement B, C of measurement device 115 is orthogonal to movement A of conveyor belt 105. System 100 can further include computing and data acquisition device 120, which can be a desk top computer, lap top computer, PDA, etc. Computing and data acquisition device 120 can further be coupled to a storage medium 125 for collection and storage of data and applications such as analysis application 130. Computing and data acquisition device 120 can further include a graphical user interface (GUI) for presentation and display of analyzed data FIG. 2 illustrates a flow chart of an exemplary surface analysis method 200. In accordance with exemplary embodiments, method 200 generally includes two parts: the first part is a method of surface measurement; and the second part is a method of surface data analysis. For the first part, at step 205 conveyor belt 105 moves sample 110 (e.g., ceramic cell) through the measurement area of measurement device 115. Measurement device 115 (e.g., sensor, scanner, wave projector, etc.) moves perpendicularly (orthogonally) to sample 110 movement. At step 210, measurement device 115 generates a measurement wave. The measurement wave can be ultrasound or laser, or other reflective waves, and x-ray. It is understood that in other exemplary embodiments and implementations, the measurement wave can be other wavelengths and frequencies. At step 215, measurement data is collection. A sensor on measurement device 115 receives the reflection and sends signals indicative of distance, thickness and other parameters to computing and data acquisition device 120 at step 220. In another exemplary implementation, measurement device can be a high resolution camera in which photos of the sample 110 can be taken at step 125. The photos can be single shot or multiple shots with multiple-resolution.

For the second part of method 200, a gauge to measure the oscillations on the surface, collected at step 220 is processed at step 225. The oscillations on the surface of sample 110 are irregular, and typically non-periodical. The data analysis step 225 decomposes the irregular oscillation into composite wavelets (small waves) with known period and location, as available by machine intelligence. This multiple wavelets decomposition is a gauge, which measures similarity of the oscillation on the surface to the wave. Before quality control, criteria are set at step 230. In general, the criteria are from cell test results with different cell surface characteristics. The characteristics include, but are not limited to: ratio between wave size and wave magnitude; and intensity of wave and the distribution (locations). In an exemplary implementation, the good performance cell sets the tolerance for the two criteria. Historical data that has been collected from prior scans and samples at step 235 is compared with the presently collected data at step 240. From a statistical point-of-view, a new ceramic surface compares to the historical data taken from previous tests. At step 245, the sample's performance is determined. If the new surface data from sample 110 falls out of the good range, the cell is more likely to have lower performance. If the new surface data is within the tolerance, the cell passes the QC.

Figure 3:
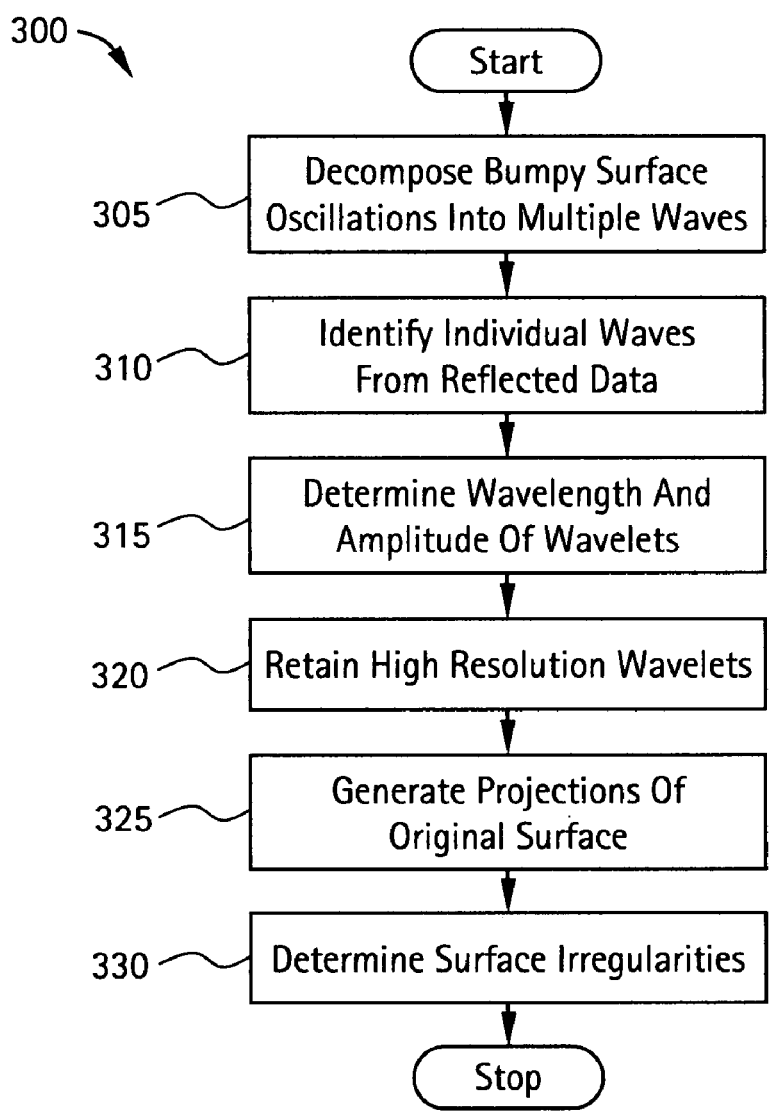
FIG. 3 illustrates an exemplary data processing method.

At step 225 above, the data is processed. FIG. 3 illustrates an exemplary data processing method 300. In general, at step 305, the collected oscillation data is decomposed into multiple waves, or wavelets. At step 310, the individual wavelets are identified and isolated. At step 315, the characteristics of the wavelets are identified and categorized, including, but not limited to, the frequency and wavelength, and amplitude of the wavelets. In general, the higher resolution wavelets are retained in order to determine the sample irregularities at step 320. In exemplary implementations, the higher frequency wavelets are retained for this determination. At step 325, the method 300 generates projections of the original surface. From these projections, using the higher resolution wavelets, the method 300 determines the surface irregularities of the sample 110 at step 330.

Example 1

Figure 4:
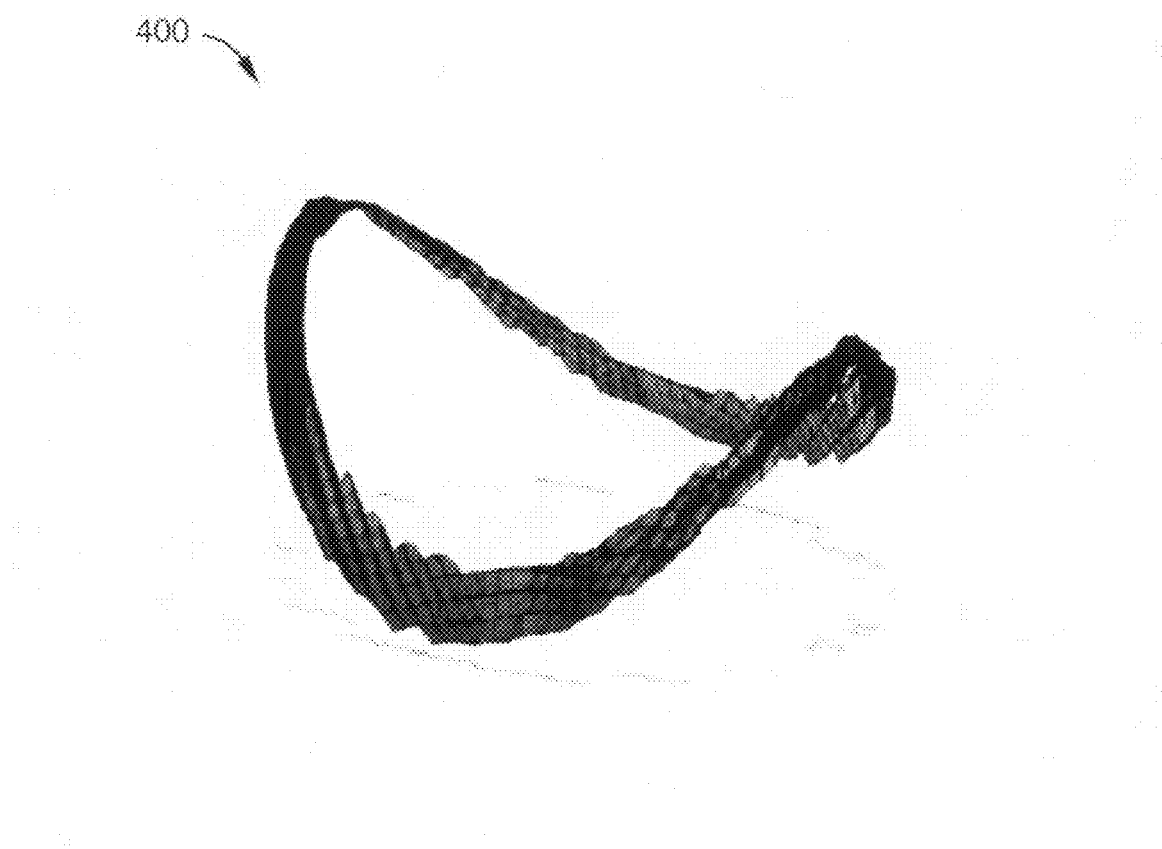
FIG. 4 illustrates an exemplary 3D rendition of edge area of original data.
Figure 5B:
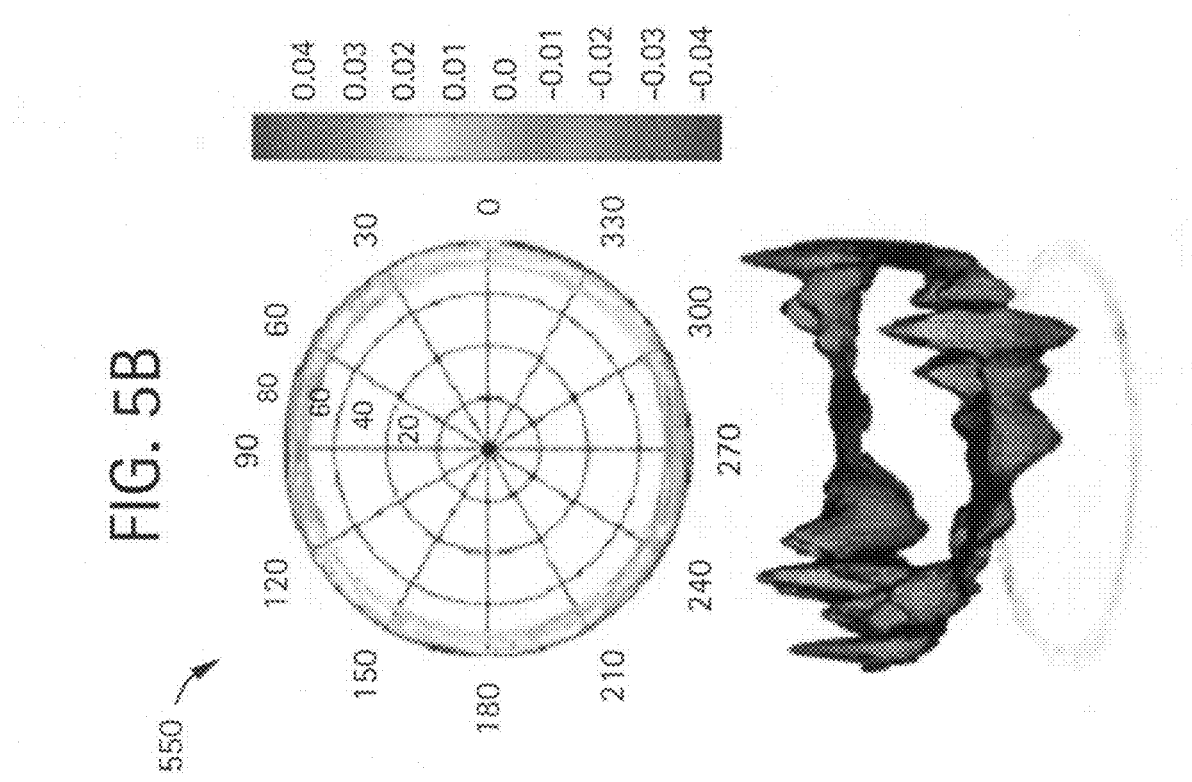
FIGS. 5a and 5b illustrate projections of the original surface by two different wavelets in accordance with exemplary embodiments.
Figure 5A:
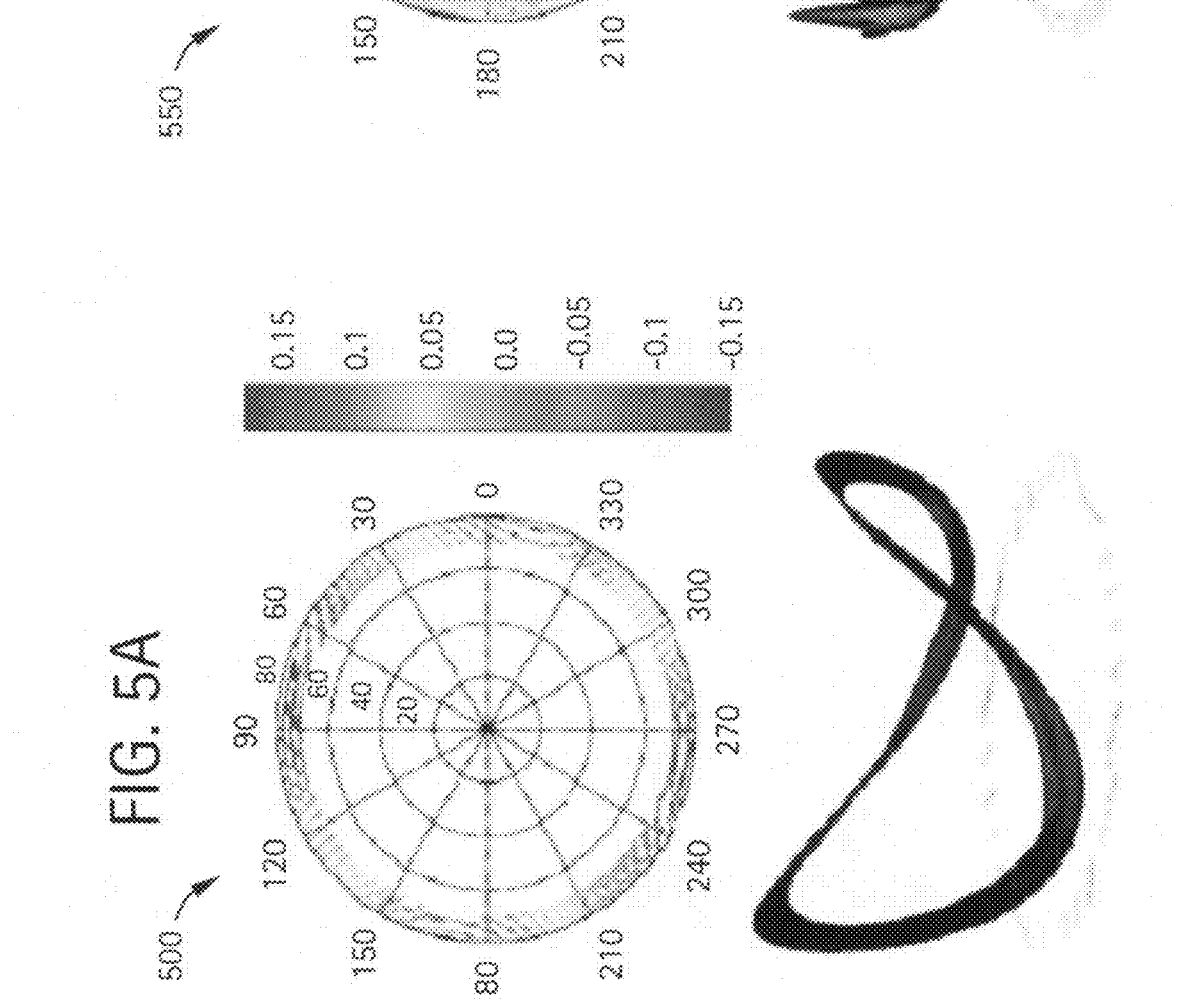

As discussed above, the method 200 allows data analysis using the wavelets. A sample is scanned using an Acu-guage laser scanner. FIG. 4 illustrates an exemplary 3D rendition 400 of edge area of original data. As illustrated, the surface is curvy and with bumps on the surface. In general, the waves on the surface of the sample are not regular. The waves are composite of small waves with different wavelengths and magnitude. By implementing methods 200, 300, the bumpy surface is decomposed into a combination of many waves in multi-resolution level, as discussed above. The higher frequency of the wavelets that are used, the finer resolution that is obtained. The original data can be decomposed by many wavelets with different wavelength. FIGS. 5a and 5b illustrate projections 500, 550 of the original surface by two different wavelets. FIG. 5a illustrates a projection 500 of a wavelet with wavelength $p_\rho$=1 mm (i.e., wavelength in the ρ direction) and $p_\theta$=2.0 radians (i.e., wavelength in the θ direction). Projection 500 illustrates a larger wavelet that fits the larger curve of the original data. FIG. 5b illustrates a projection 550 of a wavelet with wavelength $p_\rho$=4 mm and $p_\theta$=0.5 radians. Projection 550 of the smaller wavelet fits the bumps of the original data better than projection 500. Since the wavelength of the wavelets is predetermined, the wavelength represents the size of the bump that it fits.

FIGS. 6a and 6b illustrate projections 600, 650 of the original surface by two different wavelets. FIG. 6a illustrates a projection 600 of a wavelet with wavelength $p_\rho$=1 mm and $p_\theta$=2.0 radians. FIG. 6b illustrates a projection 650 of a wavelet with wavelength $p_\rho$=4 mm and $p_\theta$=0.5 radians. The projections 600, 650 are 2D representations of the wavelets. With finite support, the function aids to locate bumps on the surface of the sample. The smaller wavelets are capable of catching the higher frequency characteristics.

Example 2

The present example illustrates cell faults detection analysis using an x-ray photo, in which a ceramic cell sample surface has been photographed by x-ray. FIG. 7 illustrates an original x-ray photo 700 of a section of a SOFC cell in accordance with exemplary embodiments. The dark marks are speculated as heterogeneous particles or defects. Wavelet transformations in accordance with exemplary embodiments are implemented to identify boundary, size, location, etc. of the defects. The wavelets have a wavelength of 64 units.

Figure 8:
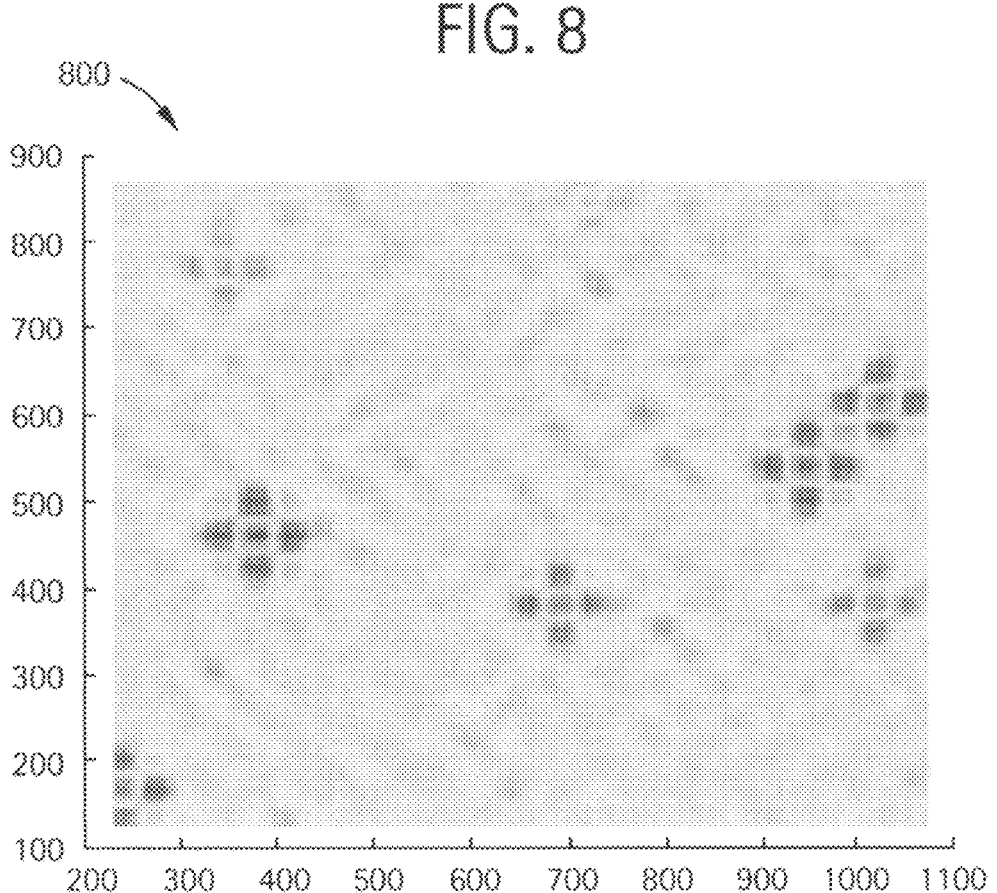
FIG. 8 illustrates a wavelet transformation of the photo of FIG. 7 in accordance with exemplary embodiments.

FIG. 8 illustrates a wavelet transformation 800 of the photo of FIG. 7 in accordance with exemplary embodiments. FIG. 8 illustrates a presentation of the transformation results in which the transform matches the photo 700 closely.

Inspection and Permeability Measurements Using Dye Penetrant

Exemplary embodiments further include a system and method implementing fluorescent dye inspection, which is used for visual inspection of surface defects in various applications, to quantitatively measure the permeability of the ceramic coating as well as to provide a visual image of the coating defects showing their size, location, and orientation. In accordance with exemplary embodiments, systems and methods monitor the amount of dye leaking through the coating, by recoding the intensity of the light emitted by the dye, and uses methods similar to those used in transient IR measurement of thermal diffusively, to measure the permeability of the coating.

The application of the dye penetrant (or other fluids) in a leak test configuration is implemented to obtain quantitative measurement of the permeability as well as a visual image of the through thickness defects that affect the permeability (such as cracks, porosity, and voids). The implementation of fluorescent dye in a leak test provides visual images of the ceramic coating defects, which provides details about the size, shape, and location of the factors affecting the coating permeability and acts as a mean to distinguish between them. Further, exemplary embodiments of the systems and methods extract features from the dye emitted light intensity profile to measure the permeability of selected regions in the coating. Therefore, the systems and methods can quantitatively measure permeability of fuel cell's ceramic coatings due to porosity (with options to measure in specific region only) and separate that from other factors contributing to permeability, such as cracks and voids in the coating.

A visual image of the coating (the fluorescent dye leaking through the fuel cell to the coating surface) can be obtained, making it possible to distinguish between the various defects, as well as provides a quantitative measure of the permeability of the coating. Therefore, the systems and methods can be implemented for inspection during manufacturing of fuel cells or products with similar inspection needs. For example, products that have ceramic coatings or permeable layers subjected to cracking, such as protective and thermal barrier coatings used in turbines for improved impact and erosion resistance.

Figure 9:
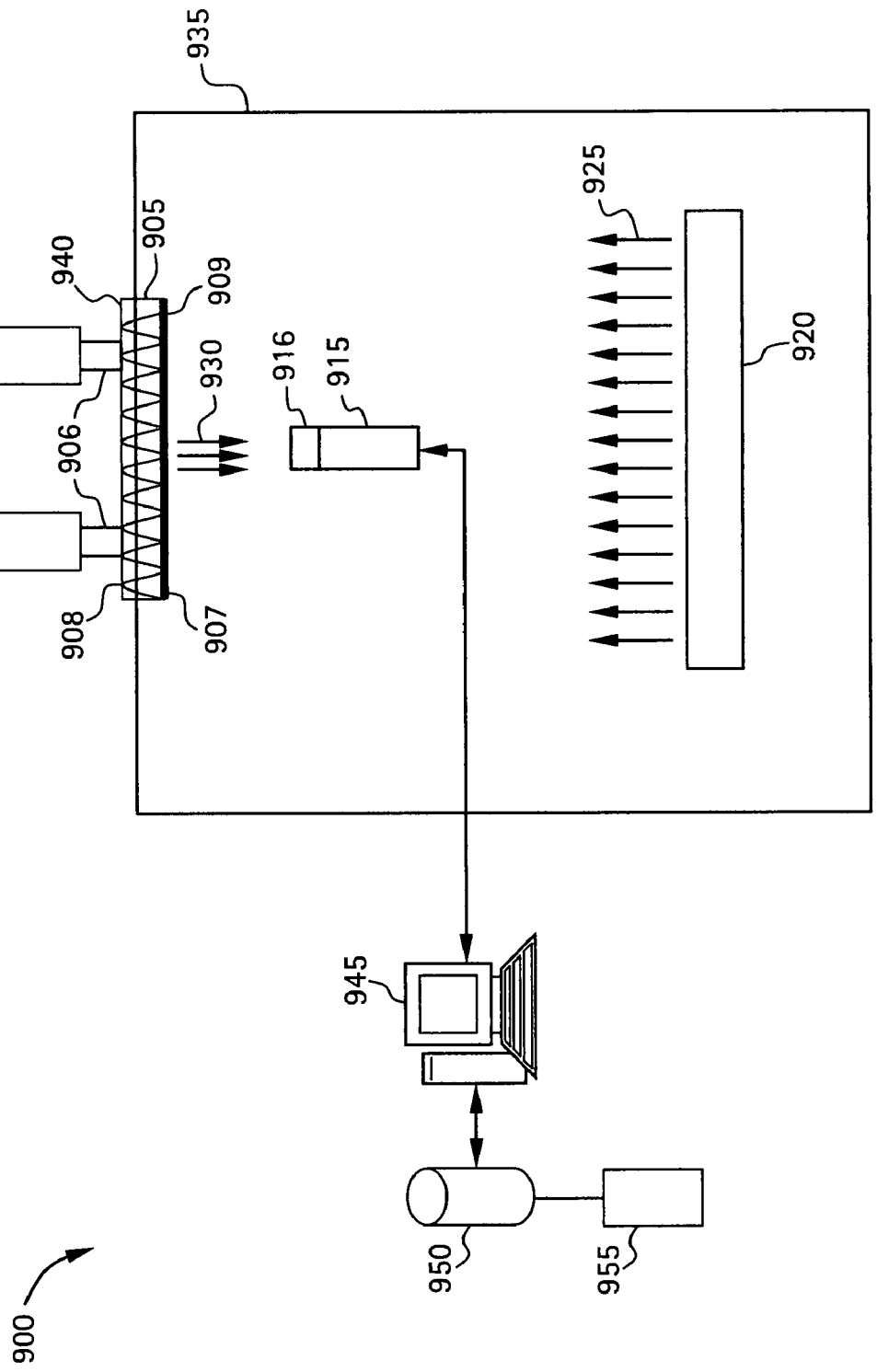
FIG. 9 illustrates an exemplary dye penetrant system.

FIG. 9 illustrates an exemplary dye penetrant system 900. System 900 generally includes sample 905, which can be a SOFC having fuel inlets/outlets 906 and a ceramic coating 907. SOFC sample 905 can further include internal corrugated sheet 908 and filter 909. Sample 905 is in communication with a dye penetrant supply 910 via fuel inlets/outlets 906. Dye penetrant supply 910 can therefore provide dye to the sample 905 as needed. System 900 further includes scanner 915, which can be a digital camera in accordance with exemplary embodiments. Scanner 915 can further include a filter 916 to allow capture of a particular band of wavelengths, generally representative of the dye color. System 900 further includes ultraviolet (UV) light source 920 for providing UV light 925 directed toward dye-penetrated ceramic surface 907, emissions 930 from which are collected by scanner 915 (discussed further in the description below). System 900 generally further includes a light-tight box 935 into which a portion of sample 905 (i.e., the ceramic coating 907), scanner 915 and UV light source 920 are disposed, such that proper generation of UV light 925 and recordation of emissions 930 are not affected by ambient sources. Ceramic surface 907 can be disposed in light-tight box 935 via fissuring 940 on an upper surface of light-tight box 935.

System 900 further include computing and data acquisition device 945, which can be a desktop computer, lap top computer, PDA etc. Computing and data acquisition device 945 can be used for acquiring the emission data as well as processing of the data. Computing and data acquisition device 945 can further be coupled to a storage medium 950 for collection and storage of data and applications such as analysis application 955. Computing and data acquisition device 945 can further include a graphical user interface (GUI) for presentation and display of analyzed data. Analysis application can be used to acquire the data, process the images and perform the calculations for the quantitative measurement of permeability.

As discussed above, dye penetrant can be used to obtain a visual inspection of defects and a quantitative measurement of permeability due to porosity simultaneously is unique. Data processing and mathematical calculations are implemented to measure the effective permeability of the sample to be tested from the dye intensity versus time profile. It is understood that in other exemplary embodiments and implementations, other devices can be analyzed in addition to SOFC, including, but not limited to protective and thermal barrier coatings in turbines combustors and airfoils, etc.

Figure 10:
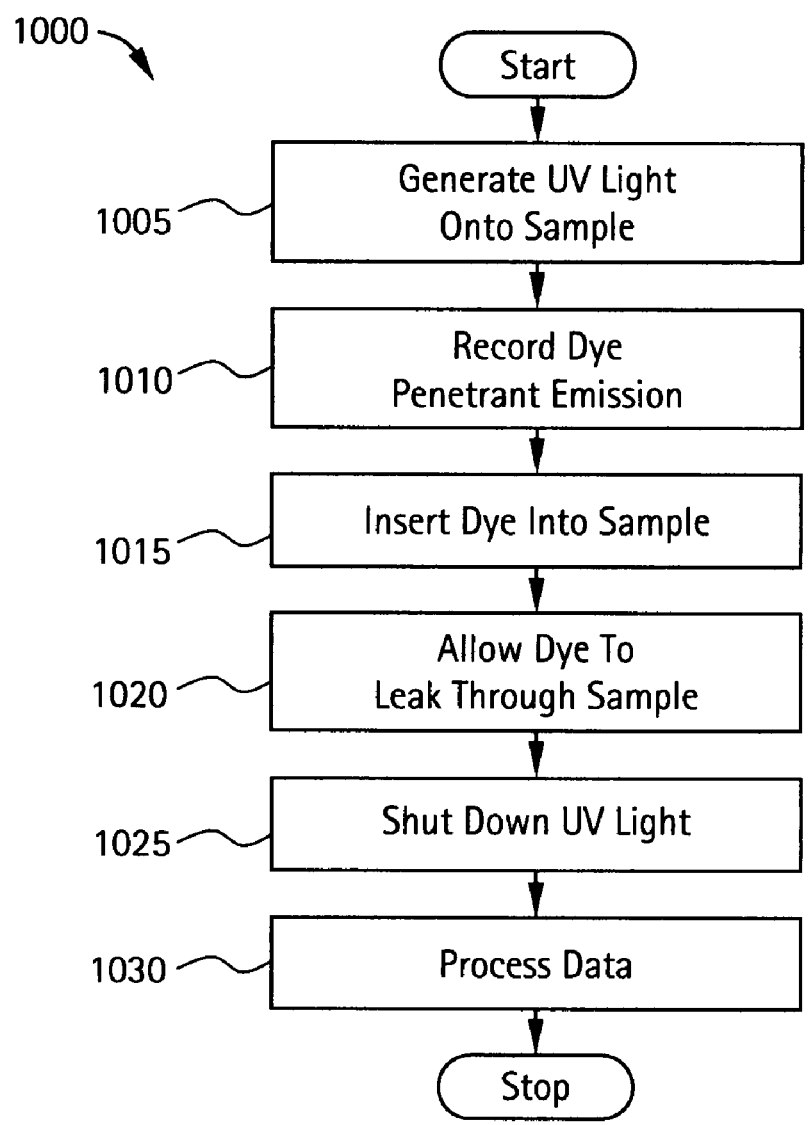
FIG. 10 illustrates a flow chart of an exemplary surface analysis method.

FIG. 10 illustrates a flow chart of an exemplary surface analysis method 1000. Once sample 905 has been suitably affixed to light-tight box 905 and coupled to dye penetrant supply 910, UV light source 920 generates UV light 925 onto sample 905 at step 1005. When UV light 925 hits sample 905, the dye on the sample's surface 907 emits visible light 930, which is recorded by scanner 915 (e.g., digital monochromic camera having optical filter 916 around the wavelength of the dye), at step 1010. In one exemplary implementation, the dye and filter 916 can be green, such that emitted light 930 is also in the green wavelength area. Dye is then inserted into the sample via the fuel inlets/outlets 906 at step 1015. At step 1020, a sufficient time period passes to allow the dye to leak through and into sample 905. Then the UV light is shut down at step 1025.

Figure 11:
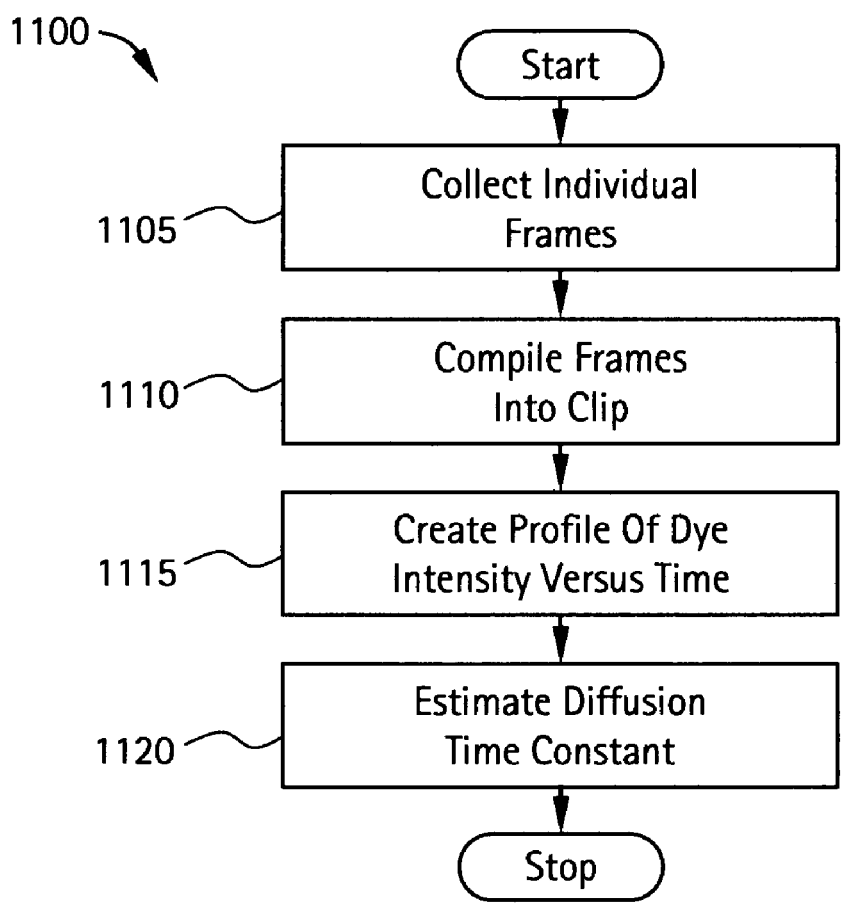
FIG. 11 illustrates an exemplary data processing method.

Data is captured by computing and data acquisition device 945 and stored in storage medium 950 and processed by application 955 at step 1030. FIG. 11 illustrates an exemplary data processing method 1100. In general, at step 1105, the data is collected as individual frames during emission from the sample 905. At step 1110, the frames are compiled into a single film clip, which can be calibrated to a calibrant (e.g., a tape with dye, dye in a transparent container, etc.), which is discussed further below with respect to FIG. 12. At step 1115 application 955 creates profiles of dye intensity versus time. At step 1120 a curve-fitting algorithm is applied to estimate the diffusion time constant as described below.

Figure 12:
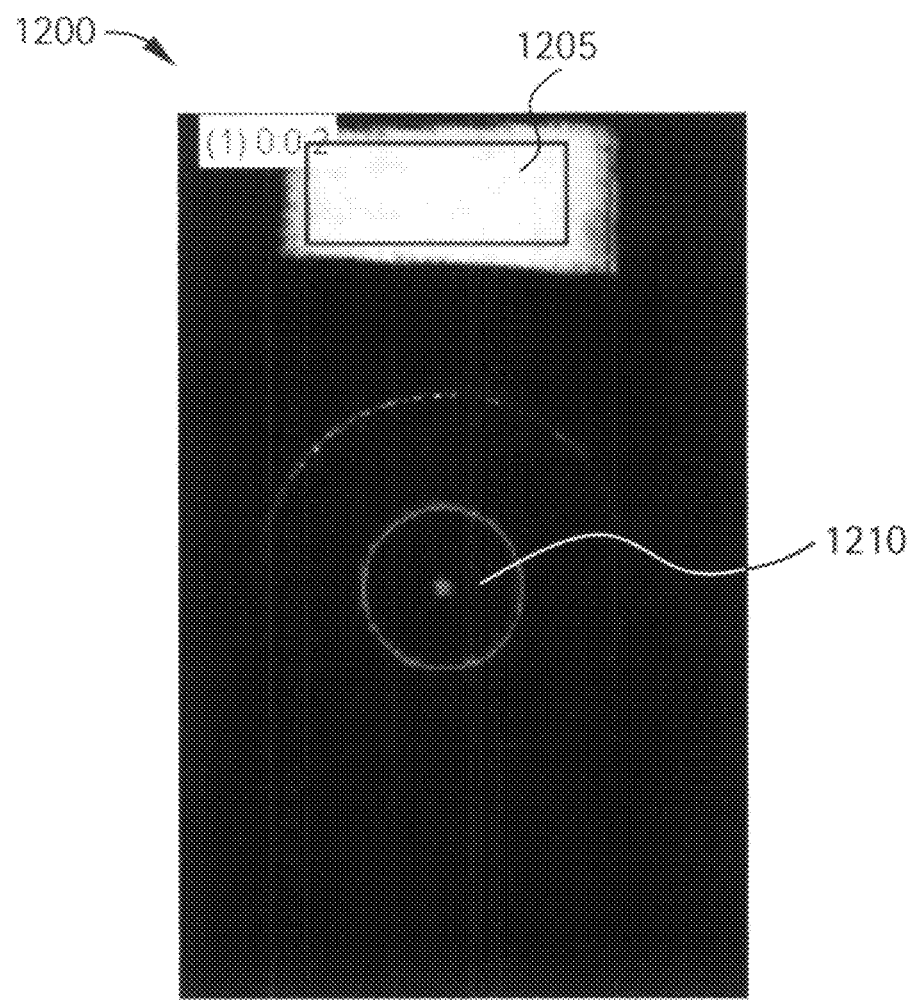
FIG. 12 illustrates an exemplary dye penetrant inspection movie 1200.

FIG. 12 illustrates an exemplary frame in a dye penetrant inspection movie 1200 created at step 1110 above. Inspection movie clip frame 1200 includes calibrant 1205 as discussed above as well as a region of interest in the image 1210.

As such the methods 1000, 1100 discussed above obtain quantitative measurements of the permeability of the ceramic coating 907. Analysis application 955 can include algorithms for correlating features in the intensity profile to the rate at which the dye leaks out of the sample 905.

Figure 13A:
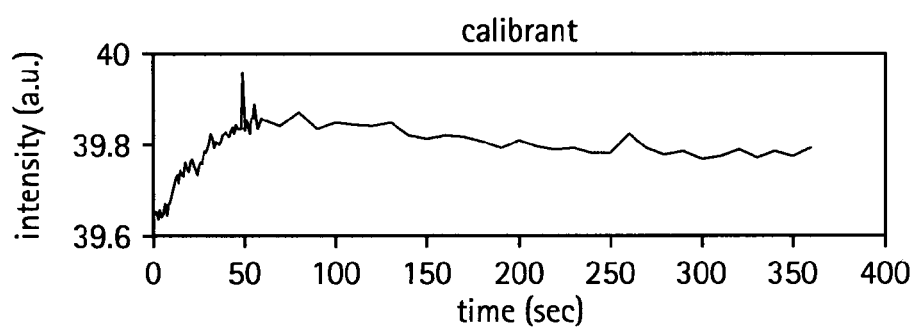
FIGS. 13a and 13b respectively illustrate an intensity versus time plot of the calibrant and target of FIG. 12.
Figure 13B:
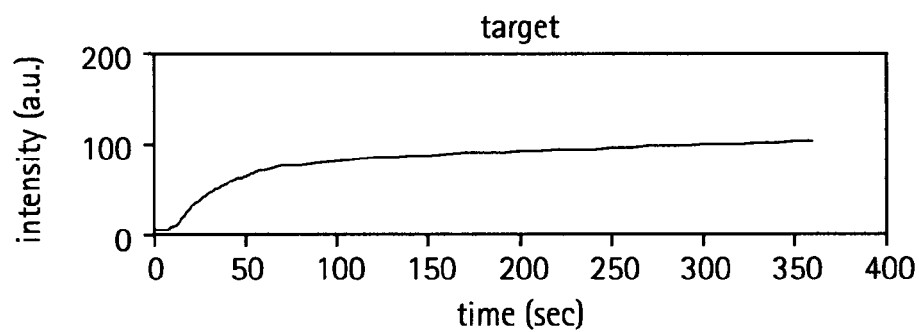
Figure 14:
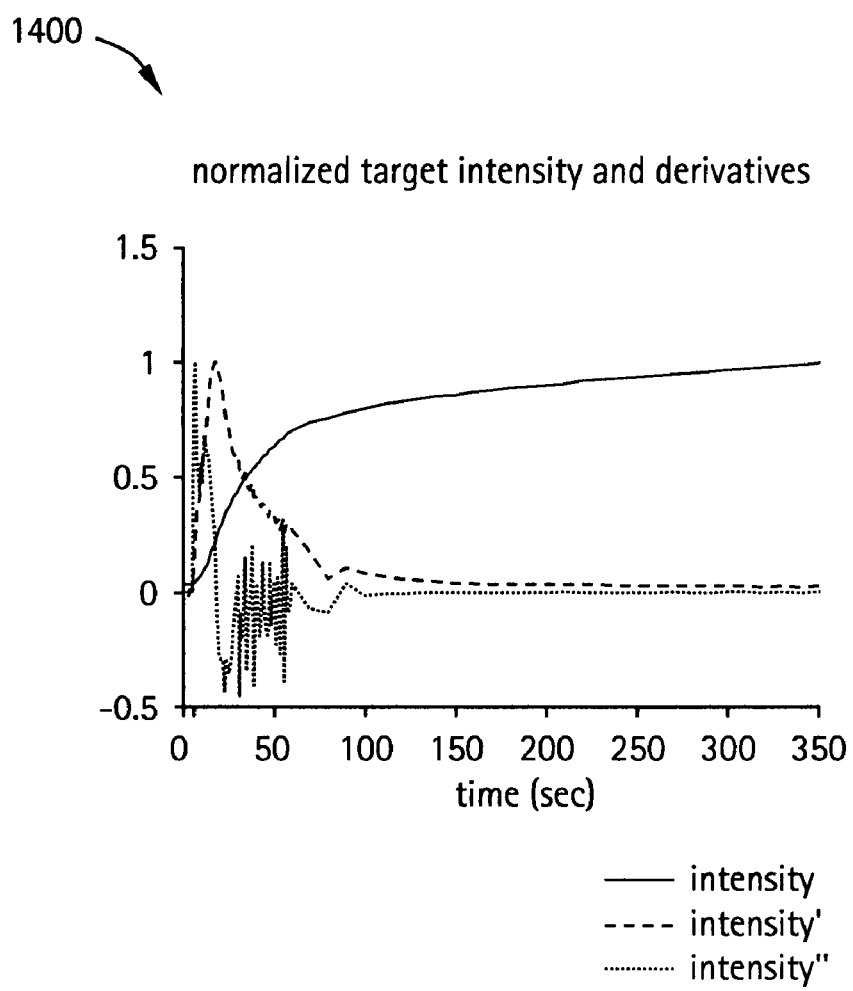
FIG. 14 illustrates a plot of normalized target intensity and derivatives.

FIGS. 13a and 13b respectively illustrate intensity versus time plots 1300, 1350 of the calibrant 1205 and target 1210 of FIG. 12. Furthermore, FIG. 14 illustrates a plot 1400 of normalized target intensity and derivatives. In general, the time of inflection point ($2^{nd}$ derivative of intensity profile=0) or other time characteristics from the slope ($1^{st}$ derivative) where noise due to numerical differentiation is less e.g., times of maximum slope and 50% of maximum slope is calculated by application 955 and could be used to estimate the diffusion coefficient of the sample. These time values are also optionally displayed on GUI of computing and data acquisition device 945.

In accordance with exemplary embodiments, the governing equation for the 1-D dye diffusion through the sample 905 having dye concentration of $C=C(x,t)$ is $C_t(x,t)=\alpha C_{xx}(x,t)$ having solution discussed below.

The effective diffusion coefficient of the cell multi-layered structure is α. Certain boundary conditions can be applied in order to solve the equations. For example, initially, the dye concentration was zero everywhere, such that $C(x,t<t_0)=0$. At time $t=t_0$, a dye concentration, $C_0$, is applied and maintained at the surface of the filter 909, where $x=0$. In general, no dye diffusion occurred beyond the sample coating surface 907, where $x=L$ for $C_x(L,t)=0$. Therefore, the solution for the above referenced equation $C_t(x,t)=\alpha C_{xx}(x,t)$ is:

$$C(x,t) = C_0 \left[ 1 - \frac{4}{\pi} \sum_{n=1}^{\infty} \frac{\sin\left(\frac{n\pi x}{2L}\right) e^{\frac{-n^2\pi^2}{4L^2}\alpha t}}{n} \right], n=1,3,5,\ldots,\infty$$

Assuming that the emitted light intensity 930 is linearly proportional to the dye concentration at the surface $x=L$ and that the maximum intensity is $I_0$ leads to the following expression of the intensity and its time derivatives at the surface L:

$$I(t) = I_0 \left[ 1 - \frac{4}{\pi} \sum_{n=1}^{\infty} \frac{\sin\left(\frac{n\pi}{2}\right) e^{\frac{-n^2\pi^2}{4L^2}\alpha t}}{n} \right], n=1,3,5,\ldots,\infty$$

$$I_t(t) = I_0 \frac{\pi\alpha}{L^2} \sum_{n=1}^{\infty} n\sin\left(\frac{n\pi}{2}\right) e^{\frac{-n^2\pi^2}{4L^2}\alpha t}, n=1,3,5,\ldots,\infty$$

$$I_{tt}(t) = -I_0 \frac{\pi^3\alpha^2}{4L^4} \sum_{n=1}^{\infty} n^3\sin\left(\frac{n\pi}{2}\right) e^{\frac{-n^2\pi^2}{4L^2}\alpha t}, n=1,3,5,\ldots,\infty$$

Figure 15A:
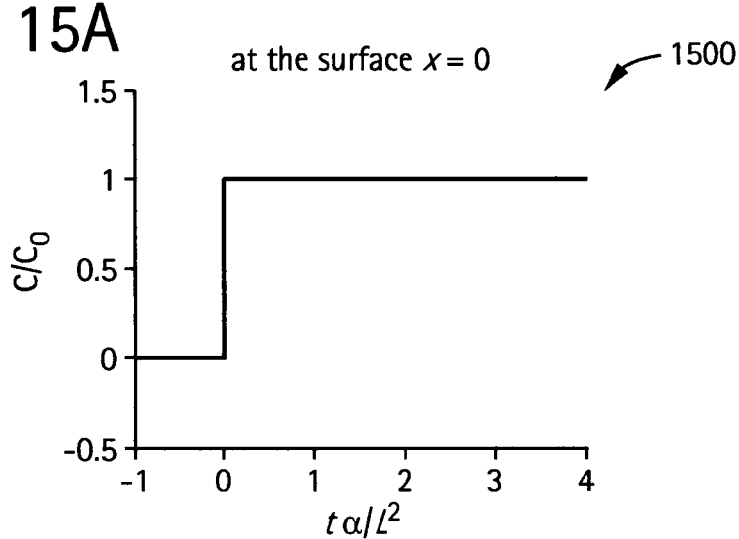
FIGS. 15a-15c illustrate three exemplary plots in accordance with exemplary embodiments.
Figure 15B:
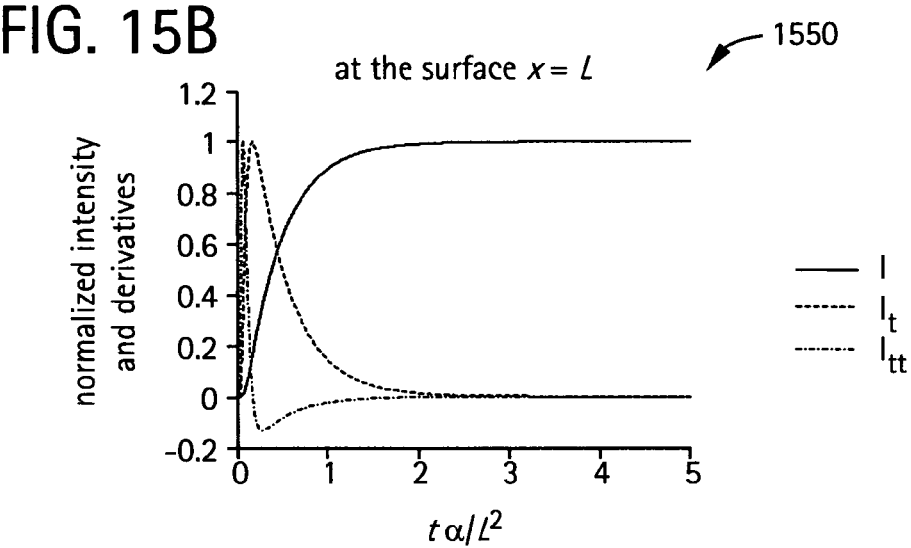
Figure 15C:
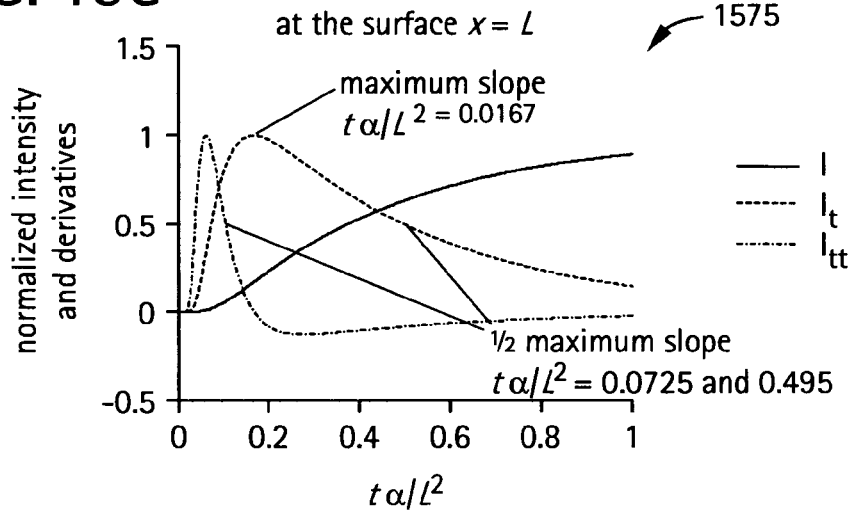

FIG. 15a illustrates the plot 1500 of $I/I0$ versus $t*\alpha/L^2$ at the boundary $x=L$. In addition, FIGS. 15b and 15c respectively illustrate a plot 1550 of normalized I, $I_t$ and $I_{tt}$ versus $t*\alpha/L^2$, and a zoomed plot 1575 to show the time characteristics discussed above. As such, an experimental profile of the dye intensity and its derivatives can be obtained, referring again to FIG. 14. By comparing a set of two or more of the time characteristics of the theoretical intensity profile to the ones obtained experimentally, one can estimate the diffusion time constant $\tau=L^2/\alpha$.

Figure 16:
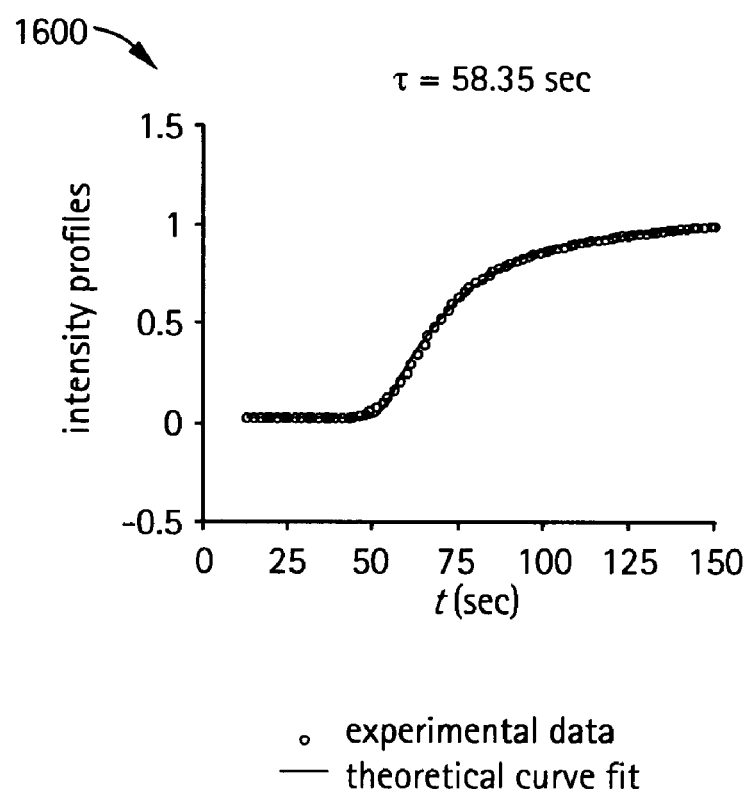
FIG. 16 illustrates an exemplary plot in accordance with exemplary embodiments.

Furthermore, it was shown that instead of using such time characteristics of the intensity profile, better estimations of the sample diffusion time constant could be obtained by performing a curve fit of the intensity profile obtained experimentally to that predicted theoretically. FIG. 16 shows a plot 1600 of the experimental and theoretical intensity profiles and the value of τ obtained by performing the curve fit process.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments configure the microprocessor to create specific logic circuits.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A solid oxide fuel cell (SOFC) surface analysis system, comprising:
    a SOFC having a ceramic surface;
    a scanner adjacent the ceramic surface for collecting data related to the ceramic surface;
    a structure for retaining the SOFC with respect to the scanner;
    a device for collecting and processing the ceramic surface data; and
    a process residing on the device, the process for analyzing and presenting the ceramic surface data.

2. The system as claimed in claim 1 wherein the scanner is a measurement device for generating a measurement wave and receiving reflections created when the measurement wave interacts with the SOFC.

3. The system as claimed in claim 2 wherein the structure for retaining the SOFC is a conveyor belt that displaces in a direction orthogonal to a displacement of the measurement device.

4. The system as claimed in claim 3 wherein the device for collecting and processing the ceramic surface data is a computer.

5. The system as claimed in claim 4 wherein the process includes instructions to:
    receive oscillation data from the reflections;
    decompose the oscillation data into wavelets;
    isolate fine resolution wavelets; and
    determine surface irregularities and defects for the fine resolution wavelets.

6. The system as claimed in claim 1 further comprising a dye penetrant supply coupled to the SOFC.

7. The system as claimed in claim 6 wherein the scanner is a digital monochromatic camera having a filter for bandpass filtering of light.

8. The system as claimed in claim 7 wherein the structure for retaining the SOFC is a light-tight box having a UV light source.

9. The system as claimed in claim 8 wherein the device for collecting and processing the ceramic surface data is a computer.

10. The system as claimed in claim 9 wherein the process includes instructions to:
    receive emission data emitted by the dye penetrant leaking through the coating of the SOFC when the UV light source shines UV onto the SOFC, and collected by the digital camera and, the filter receiving a band of wavelengths indicative of a color of the dye penetrant;
    organize the data into individual frames;

compile the frames into a film clip; and create profiles of dye intensity versus time to determine surface irregularities and defects on the SOFC and provide a quantitative measurement of the SOFC leakage rate.

11. A solid oxide fuel cell (SOFC) surface analysis method, comprising:
   identifying a surface of a SOFC for analysis;
   generating a measurement wave on the surface;
   receiving data from a reflected wave from the surface;
   processing the data to determine surface irregularities and defects; and
   generating a graphical presentation of the surface irregularities and defects.

12. The method as claimed in claim 11 wherein the measurement wave is at least one of: light, infrared, x-ray, ultrasound, and reflective waves.

13. The method as claimed in claim 12 wherein processing the data comprises:
   decomposing the reflected wave into wavelets;
   collecting fine resolution wavelets; and
   determining surface irregularities and defects from the fine resolution wavelets.

14. The method as claimed in claim 13 wherein the graphical presentation is at least one of wavelet projections and wavelet transformations.

15. The method as claimed in claim 11 further comprising injecting dye into the SOFC prior to generating the measurement wave.

16. The method as claimed in claim 15 wherein the measurement wave is UV light shined onto the SOFC surface to excite the dye penetrant leaking through and causing the leaked dye to emit light.

17. The method as claimed in claim 16 wherein processing the data comprises:
   collecting the emitted light one frame at a time;
   compiling the frames into a film clip; and
   creating a profile of dye intensity versus time.

18. The method as claimed in claim 17 wherein the graphical presentation is a plot of dye intensity versus time.

19. A system for determining irregularities and defects on a ceramic surface of a SOFC, the system comprising:
   means for retaining the SOFC;
   means for generating a measurement wave for shining on the SOFC;
   means for generating an emitted wave from the dye penetrant leaking through the SOFC;
   means for collecting emission data from the SOFC ceramic surface; and
   means for processing the emission data for a determination of the surface irregularities and defects of the ceramic surface and a measurement of its leakage rate.

20. The system as claimed in claim 19 wherein the means for generating an emitted wave comprises a dye disposed in the SOFC that creates an emission upon the shining of UV light.

* * * * *